United States Patent [19]

Mallinson

[11] Patent Number: 5,656,326
[45] Date of Patent: Aug. 12, 1997

[54] METHOD AND NOTCHED BAR APPARATUS FOR COATING HIGH VISCOSITY MATERIALS

[75] Inventor: Steven M. Mallinson, Pittsford, N.Y.

[73] Assignee: Valence Technology, Inc., Henderson, Nev.

[21] Appl. No.: 518,737

[22] Filed: Aug. 24, 1995

[51] Int. Cl.$^6$ .................. B05D 5/12; B05D 3/12; B05C 11/02

[52] U.S. Cl. .................. 427/58; 427/359; 118/60; 118/68; 118/101; 118/119; 118/123; 118/126

[58] Field of Search .................. 427/58, 355, 356, 427/358, 359; 118/60, 101, 119, 123, 126, 68

[56] References Cited

U.S. PATENT DOCUMENTS

| | | | |
|---|---|---|---|
| 4,520,049 | 5/1985 | Nakanishi | 427/359 |
| 4,925,751 | 5/1990 | Shackle et al. | 429/191 |
| 5,409,732 | 4/1995 | Leonard et al. | 118/126 |
| 5,520,958 | 5/1996 | Doesburg et al. | 118/101 |
| 5,523,122 | 6/1996 | Harada et al. | 427/428 |

*Primary Examiner*—Katherine A. Bareford
*Attorney, Agent, or Firm*—Robert Krebs

[57] ABSTRACT

In a method for coating a shear-thinning cathode material having a high viscosity on a substrate, the substrate is drawn through a nip defined by a rotating backing roller and a notched bar disposed at a distance from the backing roller. The notched bar is convexly curved in shape in a region prior to the nip and is formed with a notch extending in from the curved region of the notched bar at the nip. The cathode material is supplied onto a first surface of the substrate, the first surface facing the notched bar. At least a portion of the first surface of the substrate is coated with a uniform thickness layer of the cathode material by applying steadily increasing shear forces to the supplied cathode material as the cathode material on the substrate is drawn into the nip and contacts the curved region of the notched bar. The cathode material layer is removed from contact with the notched bar by drawing the cathode material layer coated on the substrate past the notch in the notched bar.

24 Claims, 3 Drawing Sheets

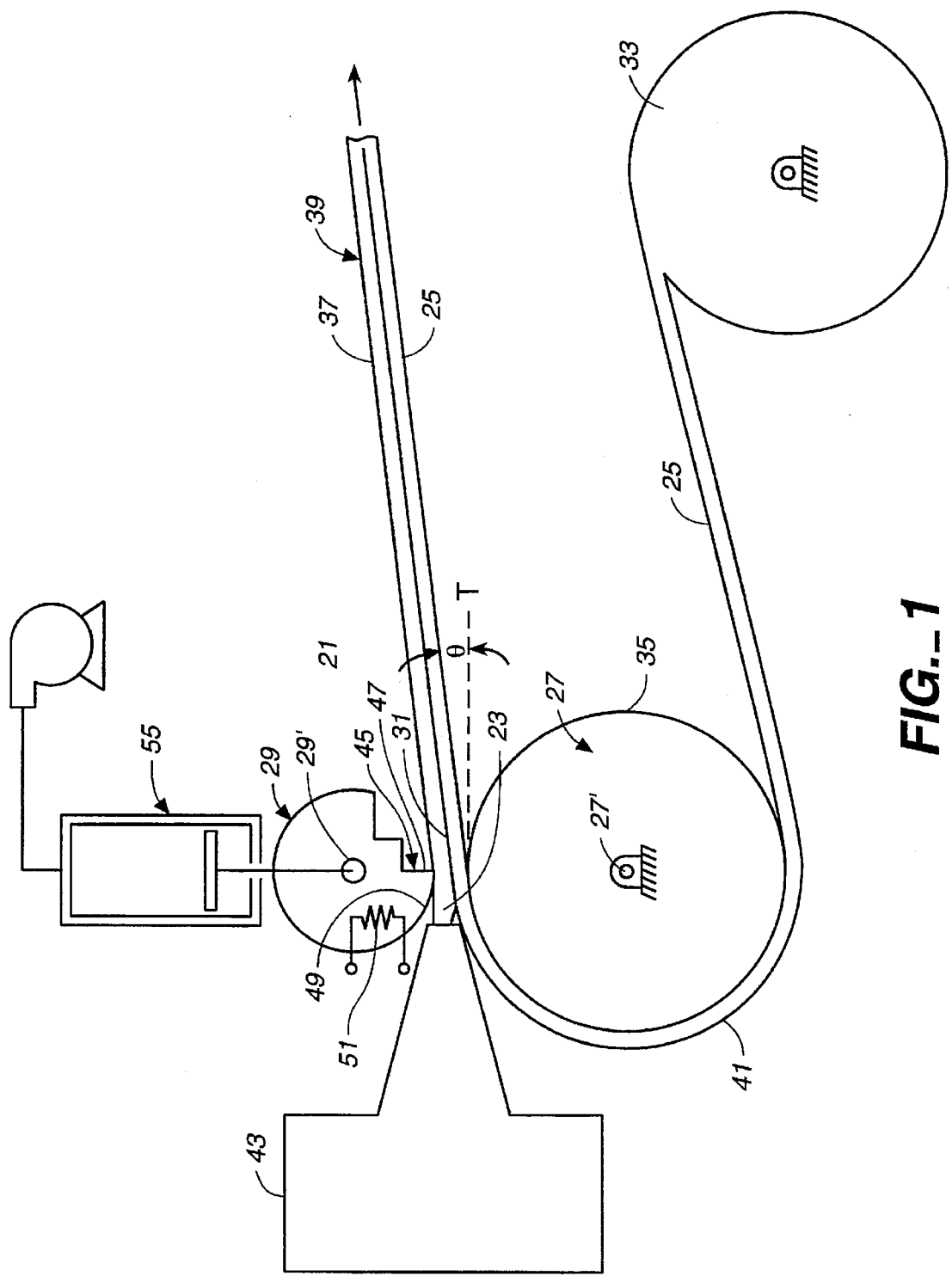
FIG._1

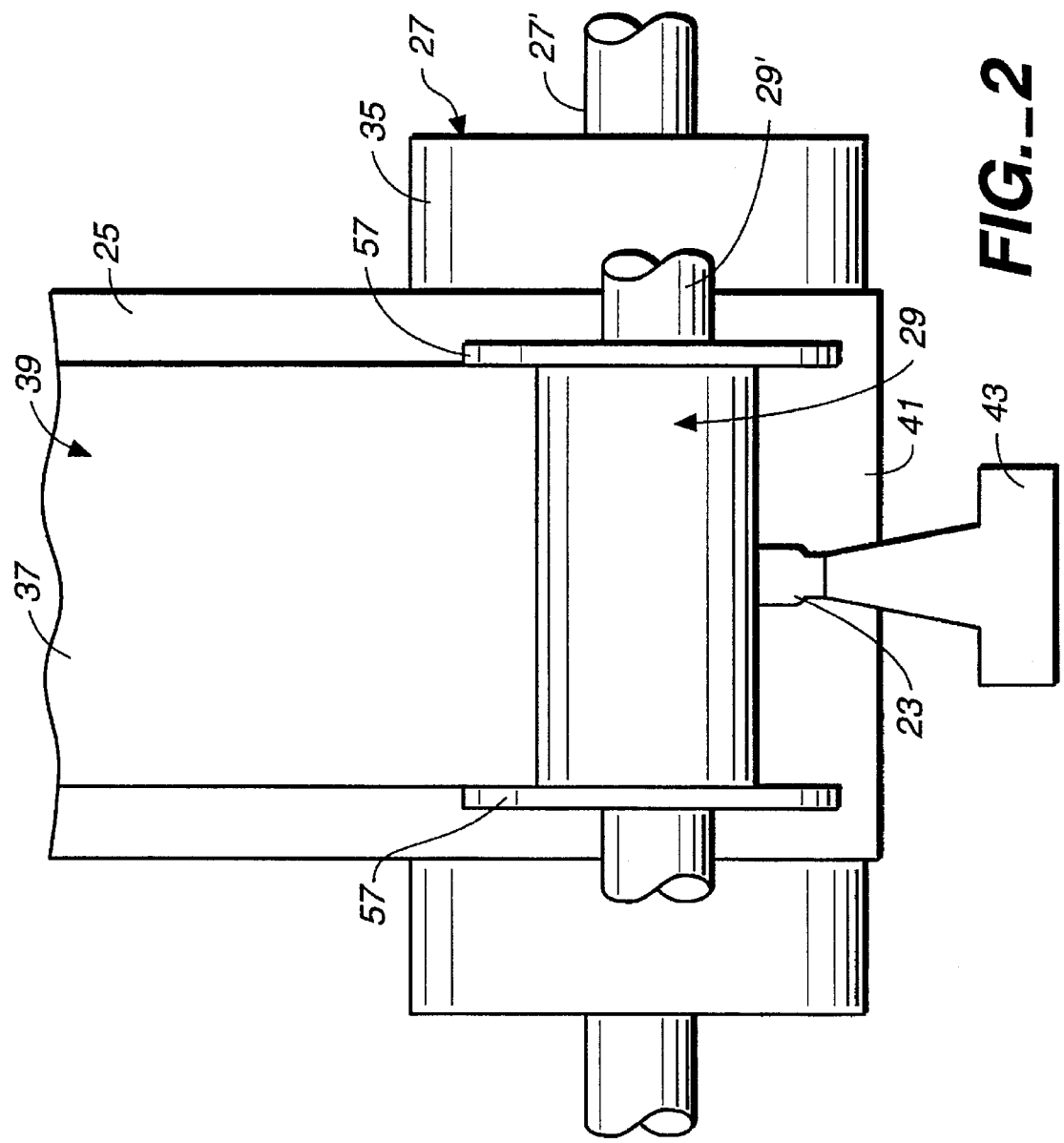

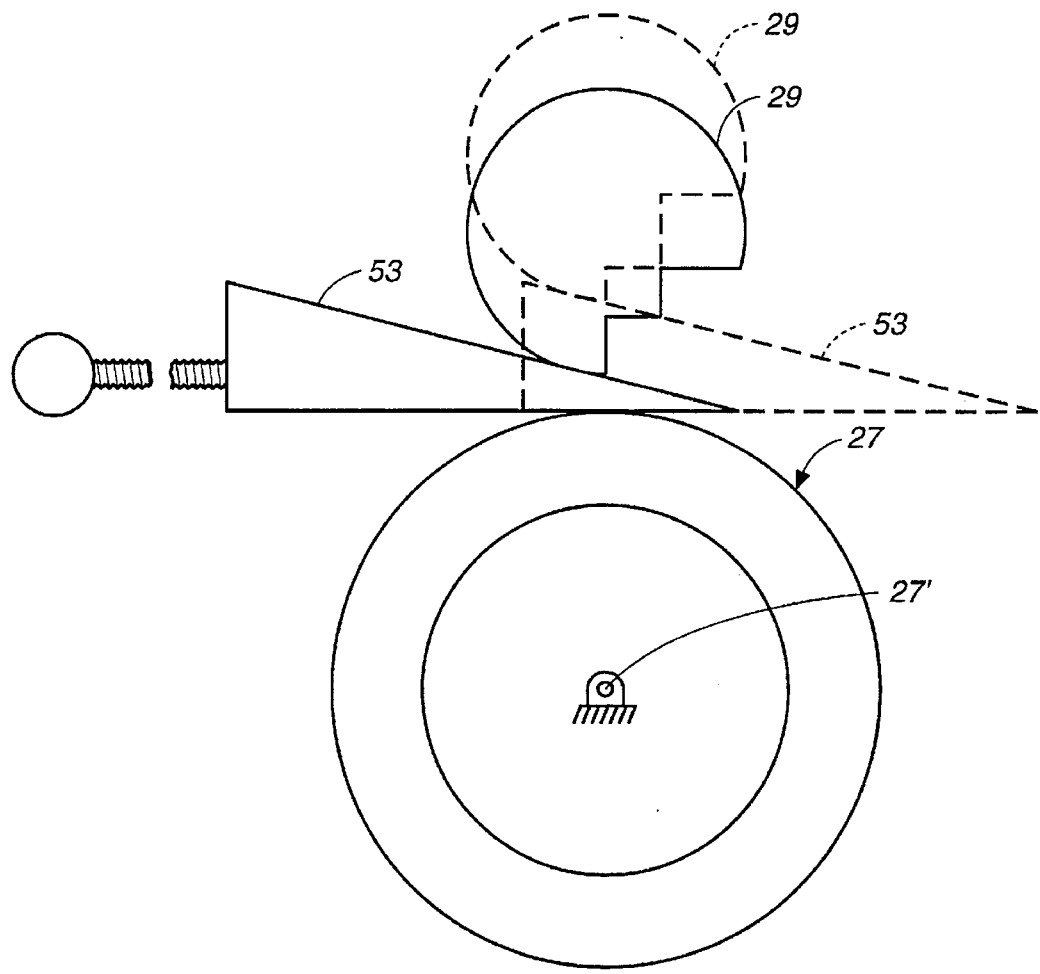
FIG._3
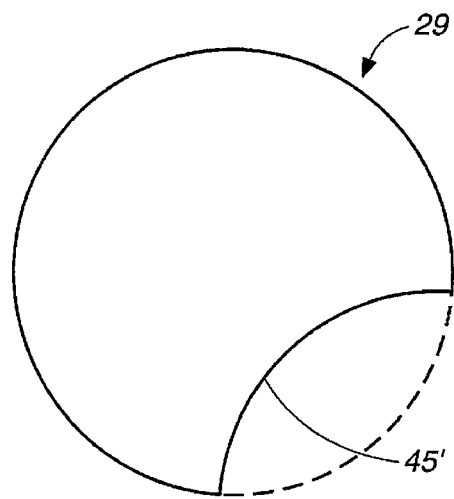
FIG._4

METHOD AND NOTCHED BAR APPARATUS FOR COATING HIGH VISCOSITY MATERIALS

BACKGROUND OF THE INVENTION

1. Field of the Invention

The present invention relates to methods and apparatus for coating high viscosity materials.

2. State of the Art

In recent years, workers in the battery art have begun to understand and recognize the advantages of so-called laminate batteries that include solid polymer electrolytes and sheet-like anode and cathodes. The advantages of such batteries include lower battery weights than conventional batteries that employ liquid electrolytes, longer service life, and relatively high power densities. The advantages of laminate batteries also include relatively high specific energies, and the elimination of the danger associated with batteries containing spillable liquid electrolytes such as acids.

Laminate batteries have been developed which possess good performance characteristics. For example, in U.S. Pat. No. 4,925,751, a laminate battery in which a cathode material formed from a mixture of an active cathodic material (preferably vanadium oxide $V_3O_8$ of $V_6O_{13}$), a conductive filler material (preferably carbon particles or filaments), and ionically conductive polymer electrolyte material is laminated on a conductive substrate material such as a nickel or copper web or sheet. A layer of polymer electrolyte material is laminated over the laminated layer of cathode material, and an anode material is applied over the laminated layer of polymer electrolyte material.

The cathode layer thickness is largely determinative of the discharge rate of the battery. The electrolyte material is applied over the cathode material by conventional coating techniques, such as with a doctor blade arrangement. The electrolyte material layer on the cathode is applied in the form of a curable, viscous, liquid and forms a layer that is generally between 5 and 50 microns thick.

The cathode material layer on the substrate generally has a thickness between 25 and 250 microns. While it is desirable to maintain as thin a layer of electrolyte material over the cathode material as possible to minimize the impedance of the electrolyte layer, if the surface of the cathode material layer is irregular and contains peaks and valleys, the average mean thickness of the electrolyte material layer must be increased to avoid excessively thin spots in the electrolyte material layer which may result in battery malfunction or failure. Good battery performance requires that the cathode layer and the electrolyte layer have constant thicknesses, with only very small tolerances being permitted. Further, construction of various battery configurations is greatly facilitated by maintaining constant thickness cathode and electrolyte material layers.

Like the electrolyte material layer, the cathode material is also applied on the substrate by conventional coating techniques, such as with a doctor blade arrangement or through an extrusion method. The cathode material is, however, a much more viscous material than the electrolyte material, often having a viscosity on the order of 1,000,000 centipoise. Moreover, the cathode material is a shear-thinning material, i.e., the viscosity of the material decreases with increasing shear.

In coating the cathode material onto a substrate, various problems with conventional coating techniques, such as extrusion, calendering, or doctor blade and roller techniques, have been identified. For example, conventional extruding apparatuses are often not adapted to accommodate shear-thinning materials. Such extruding apparatuses often include comparatively large reservoirs between comparatively small mixing chambers and extrusion nozzles. Such apparatuses are poorly suited to the shear-thinning cathode material. Large amounts of the cathode material that fills the volume of the reservoir often remains in the reservoir in a substantially stagnant condition. As additional cathode material enters the reservoir from the mixing chamber on its way to the extrusion nozzle, control of the density of the cathode material is difficult as the cathode material may expand into the reservoir or push material already in the reservoir out to the extrusion nozzle.

When cathode material is extruded from an extrusion nozzle, the cathode material, which is ordinarily under great pressure, will generally expand. Upon expanding, stray pieces of the cathode material often become "hung up" on lips of the nozzle. Such pieces of cathode material impact the subsequent extrusion by causing "striations", or streaks, in the extrusion, or they fall onto the extrusion as particles and cause lumps. Such problems are particularly acute when a lip of the extrusion nozzle serves both as an extrusion nozzle and as a doctor blade, i.e., the distance of the lips of the extrusion nozzle relative to the substrate receiving the extrusion, or a roller around which the substrate extends, is controlled so that a lip of the extrusion nozzle serves to control the thickness of the extrusion.

SUMMARY OF THE INVENTION

In accordance with one aspect of the present invention, a method for coating a shear-thinning cathode material having a viscosity of greater than 50,000 centipoise on a substrate is provided. According to the method, the substrate is drawn through a nip defined by a rotating backing roller and a notched bar disposed at a distance from the backing roller. The notched bar is convexly curved in shape in a region prior to the nip and is formed with a notch extending in from the curved region of the notched bar at the nip. The cathode material is supplied onto a first surface of the substrate, the first surface facing the notched bar. At least a portion of the first surface of the substrate is coated with a uniform thickness layer of the cathode material by applying steadily increasing shear forces to the supplied cathode material as the cathode material on the substrate is drawn into the nip and contacts the curved region of the notched bar. The cathode material layer is removed from contact with the notched bar by drawing the cathode material layer coated on the substrate past the notch in the notched bar.

In accordance with another aspect of the present invention, an apparatus for coating a shear-thinning cathode material having a viscosity of greater than 50,000 centipoise on a substrate material is provided. The apparatus includes a rotatable backing roller. A notched bar is disposed adjacent to the backing roller and, with the backing roller, defines a nip. The notched bar includes a substantially sector-shaped notch defined by at least two walls, a first one of the walls being substantially perpendicular to a tangent to the backing roller at the nip. Means are provided for drawing the substrate material from a source of substrate material over a portion of the backing roller and through the nip. Means are provided for supplying the cathode material to a first surface of the substrate material at a point prior to the nip. A portion of the notched bar contacts, and provides increasing shear stress to, the supplied cathode material as it is drawn toward the nip by the substrate so that the supplied cathode material uniformly coats at least a portion of the first surface of the substrate material.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a schematic side view of a coating apparatus according to an embodiment of the present invention;

FIG. 2 is a schematic top view of a coating apparatus according to an embodiment of the present invention;

FIG. 3 is a schematic side view of a coating apparatus according to an embodiment of the present invention; and FIG. 4 is a schematic side view of a notched bar according to another embodiment of the present invention.

DETAILED DESCRIPTION OF THE PREFERRED EMBODIMENT

In calendering apparatuses, a bead or a sheet-like extrusion of cathode material is generally placed on a moving substrate web and the web is drawn into a nip between a pair of calendering rollers. The cathode material is extremely sticky and tends to be substantially as likely to adhere to the calendering rollers as to the substrate. Various arrangements are available to minimize adherence of the cathode material to contacting rollers. For example, commonly-assigned U.S. patent application Ser. No. 07/968,370, now U.S. Pat. No. 5,346,385, teaches the use of a chilled roller to effectively "cast" the cathode material so that it does not adhere to the chilled roller as the material passes over the smooth surface of the roller in order to smooth the surface of the cathode material. Commonly-assigned U.S. patent application Ser. No. 08/078,940, now U.S. Pat. No. 5,482,587, teaches the use of a continuous web of material to which the cathode material has a low tendency to adhere between a roller and the cathode material. Commonly-assigned U.S. patent application Ser. No. 08/077,002 teaches electrostatically applying a dry powder of material of the same type that forms the cathode material to a continuous web of material to which the cathode material has a low tendency to adhere, prior to passing the web between a roller and the cathode material. While these arrangements improve the quality of the cathode material layer, it is nonetheless desirable to provide a more consistent coating method, as well as to provide a coating method requiting less auxiliary equipment.

As shown inn FIG. 1, a coating apparatus 21 is particularly useful for coating highly viscous materials onto substrates. As shown in FIGS. 1–3, the coating apparatus is more particularly useful in coating a cathode material 23 used in polymer electrolyte batteries onto a conductive substrate web 25. In battery applications, the substrate 25 is preferably an aluminum or nickel web between 8 and 50 microns thick, and the thickness of the substrate is preferably kept as close to constant as possible. However, other substrates, such as "MYLAR", available from E.I. dupont de Nemours & Co., Wilmington, Del., may also be used in, for example, non-battery related applications.

The cathode material 23 and the substrate 25 are preferably of the type disclosed in U.S. Pat. No. 4,925,751, which is incorporated by reference. The cathode material 23 is a paste-like, shear-thinning material and is highly viscous, having a viscosity greater than 50,000 centipoise. The viscosity of the cathode material 23 generally falls in the range of 50,000 to 1,000,000 centipoise.

The coating apparatus 21 includes a rotatable backing roller 27 and a notched bar 29 disposed adjacent to the backing roller. The notched bar 29 is substantially rotationally fixed, as discussed further below. The backing roller 27 and the notched bar 29 define a nip 31 through which the substrate 25 extends. The substrate 25 is preferably drawn from a source of substrate material, such as an unwinding roll 33 of substrate material, through the nip 31 at the same speed as the surface 35 of the backing roller 27, thereby minimizing the potential for wrinkling of or other damage to the delicate substrate.

Preferably, the backing roller 27 is driven and the substrate 25 is moved through the nip 31 primarily as a result of friction between the backing roller 27 and the substrate. After being coated with a layer 37 of the cathode material 23, the layer preferably being between 20 and 100 microns thick, the resulting laminate 39 is preferably further processed by being coated with a thin layer of electrolyte material and by being cured in an electron beam apparatus. The laminate 39 coated with cured cathode and electrolyte material layers is preferably wound onto a wind-up roll prior to further processing in which an anode layer is joined to the laminate adjacent the polymer electrolyte. The substrate 25 is thus also moved through the nip 31 as a result of tension from winding the coated substrate onto the wind-up roll. Further processing of the battery formed by the anode, polymer electrolyte, and cathode layers may include operations such as cutting and folding of the battery to form battery assemblies of various shapes and sizes.

Cathode material 23 is supplied on a first surface 41 of the substrate 25 facing the notched bar 29 by a supplying apparatus 43. The supplying apparatus 43 may be any apparatus suited for supplying the cathode material 23 to the substrate 25, however, extruding apparatuses having a passage or passages through which the cathode material travels which are non-increasing in size and thereby ensure non-decreasing shear of the shear-thinning cathode material, are preferred. The cathode material 23 may be supplied in any suitable form, such as in the form of a bead or in the form of a thin extruded sheet. The cathode material 23 may also be supplied to the first surface 41 of the substrate 25 in excess of the amount of cathode material that is consumed in forming the cathode material layer 37 so that a so-called "rolling dam" of cathode material is formed as a result of the movement of the substrate on the backing roller 27 prior to the nip 31.

The particular supplying apparatus 43 preferably avoids "nip starvation", i.e., failure to provide a sufficient supply of cathode material 23 at the nip 31, which can result in gaps in the layer 37 of cathode material 23 on the substrate 25. With higher viscosity cathode materials, the types of supplying apparatuses 43 which are adapted to extrude the cathode material 23 directly to the nip are preferred, as mere contact with the substrate 25 may not always draw the cathode material into the nip in sufficient and consistent quantities.

It is preferred to supply the cathode material 23 in a heated condition, usually between 35°–50° C., depending upon the flow characteristics of the polymer-based cathode material at particular temperatures, which tends to improve the ability of the cathode material to flow. The substrate 25 is also preferably prepared for being coated with the cathode material 23 by putting a thin, conductive adhesive layer on the first surface 41 of the substrate. The adhesive layer is preferably a binder solution such as a polymer and solvent, such as acrylic acid mixed with some conductive filler material, such as carbon.

The notched bar 29 is preferably substantially cylindrical in shape, and includes a substantially sector-shaped notch 45 defined by at least two walls. As shown in FIGS. 1 and 3, however, it is preferred to form the notch 45 in a "stepped" fashion, from four or more walls, to form a "double notch". The double notch arrangement permits forming a deep notch in the notched bar 29 while, at the same time, maintaining the strength of the notched bar. A deep notch 45 is preferred to permit the laminate 39 to leave the nip 31 toward further processing equipment through a range of angles Θ without danger of interfering contact between the uncured cathode layer 37 and any portion of the notched bar 29 as stress is relieved from the pressurized cathode material 23. A first wall 47 of the notch 45 is preferably perpendicular to a tangent T to the backing roller 27 at the nip 31. If desired, other configurations for the notch may be provided, such as the concavely curved notch 45' shown in FIG. 4.

When the cathode material 23 supplied to the first surface 41 of the substrate 25 approaches the nip 31, it is brought into contact with a curved surface 49 of the cylindrical notched bar 29 preceding the nip 31. The curved surface 49 is preferably convexly curved according to the radius of the, preferably, cylindrically shaped notched bar 29. The substrate 25 is in contact with the backing roller 27 and the curved surface 49 of the notched bar 29 and the first surface 41 of the substrate 25 define a space that steadily decreases in size in the direction of the nip 31. As the shear-thinning cathode material 23 is moved, with the substrate 25, toward the nip 31 in the space, shear on the cathode material is increased and the cathode material flows more easily to coat all or a desired portion of the first surface 41 of the substrate, thereby forming the cathode layer 37.

When the cathode layer 37 passes through the nip 31, the cathode layer passes a point at which the perpendicular first wall 47 of the notched bar 29 extends upwardly away from the cathode layer. The break in contact between the notched bar 29 and the cathode layer 37 caused by the movement of the cathode layer past the first wall 47 minimizes problems associated with conventional calendering equipment in which the highly sticky cathode material would ordinarily have a tendency to continue to adhere to a nip roller after the cathode layer had passed through the nip. Upon passing out of the nip 31, the cathode layer 37, which is ordinarily pressurized in the nip to pressures of up to approximately 10,000 pli (pounds per linear inch), may expand. The extra-deep notch 45 is, for this additional reason, preferred in order to minimize or avoid "hang up" or other undesired contact between the cathode layer 37 and the notched bar. In addition, the surface of the notched bar 29 is preferably highly polished, preferably to an average surface roughness of less than 10 μm, to minimize adherence of material. The notched bar 29 is also preferably formed of or includes a surface formed of a material having great hardness to minimize problems associated with wear due to the highly viscous cathode material.

Heating devices such as resistance heating elements 51 are preferably disposed inside of the notched bar 29 to heat at least the curved surface 49 and improve the flow characteristics of the cathode material 23. The heating devices are preferably adapted to maintain the temperature of the cathode material in the range of 35°–50° C. and the notched bar 29 is preferably sufficiently large to act as a heat sink for maintaining constant temperatures.

The notched bar 29 and the backing roller 27 are preferably mounted relative to one another on axles 29' and 27', respectively, supported by a mounting structure. The mounting structure (not shown) is any suitable structure for mounting the notched bar 29 and the backing roller 27 relative to one another such as a frame. Important to the proper performance of the apparatus is the ability of the mounting structure to withstand the great pressures formed in the nip. The backing roller 27, as noted above, is rotated and is, accordingly, preferably provided with some suitable drive mechanism, such as an electric motor and a chain or gear drive. While the backing roller 27 may be driven as a result of friction with the substrate 25 which extends around the roller and is moved by a wind-up roller, since the substrate is usually quite thin and delicate, it is preferred to drive the backing roller. If desired, the notched bar 29 is rotatably adjustable through at least a small angle. In use, however, the notched bar 29 is preferably stationary, and it is normally desired to maintain the first wall 47 perpendicular to the tangent T.

Rotation of the notched bar 29 may be desirable in various circumstances, such as where it is desired to reposition the first wall 47 relative to the tangent T when, after use, the first wall 47 is moved away from the perpendicular. Accordingly, various well-known structures for adjustably fastening the notched bar 29 to the axles 29' of the notched bar or to the mounting structure, or for adjustably fastening the axles to the mounting structure are preferably provided. Such structures may include braking devices for adjustably securing the notched bar 29 to the axle 29' or flanges for adjustable fastening of the notched bar or the axle to the mounting structure, or both.

While particular coating operations may also be facilitated by moving the first wall 47 so that it is not perpendicular to the tangent T, it is presently understood that, if the notched bar 29 shown in FIG. 1 is rotated counter-clockwise, the curved surface 49 of the notched bar acts in a manner similar to a nip roller in a conventional calendering apparatus and, after the cathode layer 37 passes through the nip 31, the cathode layer may tend to adhere to the curved surface, rather than breaking away cleanly. It is further understood that, if the notched bar 29 is rotated clockwise so that the first wall 47 and the tangent T define an angle of less than 90°, there may be a tendency for pieces of the cathode layer 37 to "hang up" on the first wall and cause striations or lumps in a manner similar to doctor blade apparatuses or extrusion nozzle/doctor blade apparatuses.

The size of the nip 31 is preferably adjustable by moving one or both of the backing roller 27 and the notched bar 29. As shown in FIG. 3, a preferred device for moving the notched bar 29 relative to the backing roller 27 includes a wedging device including one or more, preferably at least two, movable wedges 53 disposed between portions of the notched bar or the axles 29' of the notched bar and portions of the backing roller 27 or the axles 27' of the backing roller. The wedges 53 are preferably disposed on opposite sides of the path of travel of the substrate 25 and are movable in or out to increase or decrease, respectively, the size of the nip 31. The wedges 53 are preferably movable through very small distances to permit incremental adjustments to the size of the nip. A suitable device for moving a wedge 53 includes a rotatable threaded rod that is received in a threaded bore in the wedge. Upon rotation of the threaded rod, which does not move axially, the wedge 53 moves in or out to raise or lower the notched bar 29 and increase or decrease the size of the nip, respectively. The apparatus 21 is preferably provided with two wedges 53 disposed at opposite ends of the notched bar 29 to permit independent movement of the ends of the notched bar. As noted above, the ability of the mounting structure, including the above-described wedging device, is important to the proper functioning of the apparatus.

Other suitable devices for moving the wedge include well-known electric, hydraulic, or pneumatic devices. Further, as shown in FIG. 1, a hydraulic device 55, or an electric or a pneumatic device, may be used to move the notched bar 29 without the use of a wedge, or in addition to the above-described wedge arrangement. As noted above, however, the use of such devices in conjunction with a wedge 53 facilitates adjustment of the size of the nip through extremely small increments. While the foregoing has described an embodiment in which the notched bar 29 is moved relative to the backing roller 27, it will be understood that the backing roller may, if desired, be moved instead of the notched bar, or in addition to the notched bar.

In order to permit increasing or decreasing the size of the nip 31, the notched bar 29 is movably mounted on the mounting structure relative to the backing roller. However, to ensure maintenance of extremely small tolerances, deflection of either the backing roller or the notched bar is minimal, even under the highest loads. For example, because of the highly viscous nature of the cathode material, it is preferred to provide a backing roller 27 and a notched bar 29, and mountings therefor, that deflect less than one micron with a nip pressure of 10,000 pli. Accordingly, both the backing roller 27 and the notched bar 29 are preferably sufficiently large, made of sufficiently strong material, and mounted relative to one another on the mounting structure to withstand such pressures.

Where the thickness of the substrate 25 is constant, the tolerances of the thickness of the cathode layer 37 are controlled in large part by the TIR (total indicator runout), which is mainly a function of deflection of the surface 35 of the backing roller 27 as the roller rotates, assuming no deflection of the notched bar 29. Accordingly, by minimizing the deflection of the backing roller 27 and the notched bar 29, it is possible to maintain extremely close tolerances on the overall thickness of the laminate 39. Further, it is preferred that the notched bar 29 be of at least 50 Rockwell hardness to prevent etching of the notched bar through contact over time with the cathode material. Chroming of the backing roller 27 and the notched bar 29 is preferred to extend their lives and ensure tolerances and to prevent material from sticking to the surface of the notched bar.

As shown in FIG. 2, the notched bar 29 may be shorter than the backing roller 27 and may be disposed substantially centrally relative to the backing roller. The substrate 25 is ordinarily no wider than the notched bar 29. Where the apparatus is used with materials having lower viscosites, i.e., less than 50,000 centipoise, is contemplated, a pair of dams 57 are preferably disposed at opposite ends of the notched bar 29 to prevent cathode material from being squeezed past the ends of the notched bar. At higher viscosities, i.e., above 50,000 centipoise, the formation of the above-noted "rolling dam" of cathode material tends to minimize problems associated with cathode material squeezing out from the edges. Through the use of the pair of dams 57, it is possible to coat the substrate 25 with lower viscosity materials all the way to its edges without permitting cathode material 23 to be squeezed beyond the ends of the notched bar.

In a method for coating the cathode material 23 on the substrate 25, the substrate is drawn through the nip 31 defined by the rotating backing roller 27 and the notched bar 29 disposed at a distance from the backing roller. The surface 49 of the notched bar 29 is curved in a region prior to the nip 31 and the notched bar is formed with a notch 45 extending in from the curved region at the nip. The cathode material 23 is supplied by the supplying apparatus 43 onto the first surface 41 of the substrate 25.

At least a portion of the first surface 41 of the substrate 25 is coated with a uniform thickness layer 37 of the cathode material 23 by applying steadily increasing shear forces to the supplied cathode material as the cathode material on the substrate is drawn into the nip 31 and contacts the curved surface 49 of the notched bar 29. The cathode material layer 37 is removed from contact with the notched bar 29 by drawing the cathode material layer coated on the substrate 25 past the notch 45 in the notched bar. The total deflection of the backing roller 27 and the notched bar 29, combined, when the cathode material 23 is coated on the first surface 41 of the substrate 25, is preferably limited to less than one micron.

The thickness of the coated cathode material layer 37 on the substrate 25 is adjusted, if desired, by adjusting the distance between the notched bar 29 and the backing roller 27. Wedges 53 are preferably moved between portions of the notched bar 29 and the backing roller 27 to adjust the size of the distance between the notched bar and the backing roller. The wedges 53 are preferably disposed at opposite ends of the notched bar 29 so that the distance between the first end of the notched bar and the backing roller 27 is adjustable separately from a distance between a second end of the notched bar and the backing roller.

The notch 45 is preferably defined by at least two walls forming an angle relative to one another. A first wall 47 of the notch 45 is preferably perpendicular to the tangent T to the backing roller 27 at the nip 31. An angular orientation of the notched bar 29 and, more particularly, the first wall 47, is preferably adjustable relative to the backing roller 27. The angular orientation of the notched bar 29 is preferably adjusted to maintain the first wall 47 of substantially perpendicular to the tangent T to the backing roller at the nip. The length of the first wall 47 is preferably greater than two times the thickness of the cathode material layer 37 to facilitate extending the laminate 39 upwardly upon leaving the nip 31.

The cathode material 23 is preferably supplied to the first surface 41 of the substrate 25 by the supplying apparatus 43 either in the form of a bead of cathode material or in the form of a sheet of cathode material. If desired, a rolling dam of supplied cathode material 23 is formed on the first surface 41 of the substrate 25 prior to the nip 31.

At least where low viscosity cathode materials are used, the transverse width of the cathode material layer 37 on the substrate 25 is preferably limited by dams 57 disposed at opposite ends of the notched bar 29 adjacent the nip 31. The cathode material 23 is preferably heated prior to supplying the cathode material to the first surface 41 of the substrate 25. The cathode material 23 may be heated by resistance heating elements 51 disposed in the notched bar 29, or by other heating elements, such as heating elements disposed in supply lines, in the backing roller 27, or in the supplying apparatus 43.

The foregoing has described the principles, preferred embodiments, and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for coating a shear-thinning cathode material having a viscosity of greater than 50,000 centipoise on a substrate, comprising the steps of:

drawing the substrate through a nip defined by a rotating backing roller and a notched bar disposed at a distance from the backing roller, the notched bar being convexly curved in shape in a region prior to the nip and being formed with a notch extending in from the curved region of the notched bar at the nip, the notched bar being substantially cylindrical and the notch being defined by more than two walls forming an angle relative to one another;

supplying the cathode material onto a first surface of the substrate, the first surface facing the notched bar;

coating at least a portion of the first surface of the substrate with a uniform thickness layer of the cathode material by applying steadily increasing shear forces to the supplied cathode material as the cathode material on the substrate is drawn into the nip and contacts the curved region of the notched bar; and removing the cathode material layer from contact with the notched bar by drawing the cathode material layer coated on the substrate past the notch in the notched bar.

2. The method as set forth in claim 1, comprising the further step of adjusting a thickness of the coated cathode material on the substrate by adjusting the distance between the notched bar and the backing roller.

3. The method as set forth in claim 2, wherein the distance between the notched bar and the backing roller is adjusted by moving wedge means between portions of the notched bar and the backing roller.

4. The method as set forth in claim 2, wherein a distance between a first end of the notched bar and the backing roller is adjustable separately from a distance between a second end of the notched bar and the backing roller.

5. The method as set forth in claim 1, comprising the further step of adjusting an angular orientation of the notched bar relative to the backing roller.

6. The method as set forth in claim 1, wherein the angular orientation of the notched bar is adjusted to maintain a first one of the walls substantially perpendicular to a tangent to the backing roller at the nip.

7. The method as set forth in claim 1, comprising the further step of maintaining a first one of the walls substantially perpendicular to a tangent to the backing roller at the nip, and wherein a length of the first one of the walls is greater than two times a thickness of the cathode material layer.

8. The method as set forth in claim 1, wherein the cathode material is supplied in the form of a bead of cathode material.

9. The method as set forth in claim 1, wherein the cathode material is supplied in the form of a sheet of cathode material.

10. The method as set forth in claim 1, comprising the further step of forming a rolling dam of supplied cathode material prior to the nip.

11. The method as set forth in claim 1, comprising the further step of limiting a transverse width of the cathode material layer.

12. The method as set forth in claim 11, wherein the transverse width of the cathode material layer is limited by dams disposed at opposite ends of the notched bar adjacent the nip.

13. The method as set forth in claim 1, comprising the further step of heating the cathode material prior to supplying the cathode material.

14. The method as set forth in claim 1, comprising the further step of heating the cathode material by heating the notched bar.

15. The method as set forth in claim 1, comprising the further step of heating the cathode material by heating the backing roller.

16. The method as set forth in claim 1, comprising the further step of limiting a total deflection of the backing roller and the notched bar, combined, when the cathode material is coated on the first surface of the substrate, to less than one micron from positions of the backing roller and the notched bar when no cathode material is being coated on the first surface of the substrate.

17. The method as set forth in claim 1, wherein the notched bar is non-rotatable.

18. A method for coating a shear-thinning cathode material having a viscosity of greater than 50,000 centipoise on a substrate, comprising the steps of:

drawing the substrate through a nip defined by a rotating backing roller and a notched bar disposed at a distance from the backing roller, the notched bar being convexly curved in shape in a region prior to the nip and being formed with a notch extending in from the curved region of the notched bar at the nip;

supplying the cathode material onto a first surface of the substrate, the first surface facing the notched bar;

coating at least a portion of the first surface of the substrate with a uniform thickness layer of the cathode material by applying steadily increasing shear forces to the supplied cathode material as the cathode material on the substrate is drawn into the nip and contacts the curved region of the notched bar; and removing the cathode material layer from contact with the notched bar by drawing the cathode material layer coated on the substrate past the notch in the notched bar, wherein the notched bar is substantially cylindrical and the notch is defined by a concavely curved wall.

19. An apparatus for coating a shear-thinning cathode material having a viscosity of greater than 50,000 centipoise on a substrate material, comprising:

a driven, rotatable backing roller;

a notched bar disposed adjacent to the backing roller, the notched bar, with the backing roller, defining a nip, the notched bar including a notch defined by more than two walls, a first one of the walls being substantially perpendicular to a tangent to the backing roller at the nip;

means for drawing the substrate material from a source of substrate material over a portion of the backing roller and through the nip;

means for supplying the cathode material to a first surface of the substrate material at a point prior to the nip; and a portion of the notched bar contacting, and providing increasing shear stress to, the supplied cathode material as it is drawn toward the nip by the substrate so that the supplied cathode material uniformly coats at least a portion of the first surface of the substrate material.

20. The apparatus as set forth in claim 19, wherein a total deflection of the backing roller and the notched bar, combined, when the cathode material is coated on the first surface of the substrate material, is less than 1 micron from positions of the backing roller and the notched bar when no cathode material is being coated on the first surface of the substrate.

21. The apparatus as set forth in claim 19, further comprising means for moving the notched bar relative to the backing roller.

22. An apparatus for coating a shear-thinning cathode material having a viscosity of greater than 50,000 centipoise on a substrate material, comprising:

a driven, rotatable backing roller;

a notched bar disposed adjacent to the backing roller, the notched bar, with the backing roller, defining a nip, the notched bar being substantially cylindrical and having a notch therein that is defined by a concavely curved wall, an end of the concavely curved wall being substantially perpendicular to a tangent to the backing roller at the nip;

means for drawing the substrate material from a source of substrate material over a portion of the backing roller and through the nip;

means for supplying the cathode material to a first surface of the substrate material at a point prior to the nip; and a portion of the notched bar contacting, and providing increasing shear stress to, the supplied cathode material as it is drawn toward the nip by the substrate so that the supplied cathode material uniformly coats at least a portion of the first surface of the substrate material.

23. The apparatus as set forth in claim 22 wherein a total deflection of the backing roller and the notched bar, combined, when the cathode material is coated on the first surface of the substrate material, is less than 1 micron from positions of the backing roller and the notched bar when no cathode material is being coated on the first surface of the substrate.

24. The apparatus as set forth in claim 22, further comprising means for moving the notched bar relative to the backing roller.

* * * * *